United States Patent
Kon et al.

(10) Patent No.: US 6,314,357 B1
(45) Date of Patent: *Nov. 6, 2001

(54) LOCK-UP CONTROL DEVICE

(75) Inventors: Takanori Kon; Yoshiharu Saito, both of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,016

(22) Filed: Sep. 30, 1998

(30) Foreign Application Priority Data

Oct. 1, 1997 (JP) ..................................................... 9-269060

(51) Int. Cl.[7] ............................. G06F 17/00; F16H 61/58; B60K 41/02; F16D 33/00
(52) U.S. Cl. ................................ 701/67; 701/64; 477/63; 477/70; 477/77; 477/79; 192/3.28; 192/3.31
(58) Field of Search ................................ 701/64, 67, 68; 477/39, 43, 125, 70, 74, 77, 78, 79, 83, 86, 75, 84, 90, 57, 62, 89, 91, 133, 136, 141, 63; 192/3.28, 3.31

(56) References Cited

U.S. PATENT DOCUMENTS

| | | | |
|---|---|---|---|
| 4,526,557 | * 7/1985 | Tanaka et al. ........................ | 474/18 |
| 4,543,855 | * 10/1985 | Oetting et al. ....................... | 74/859 |
| 4,714,145 | * 12/1987 | Kurihara et al. ..................... | 192/52 |
| 4,725,951 | * 2/1988 | Niikura ................................ | 701/68 |
| 5,035,308 | * 7/1991 | Baba et al. .......................... | 192/52 |
| 5,086,894 | * 2/1992 | Iizuka et al. ........................ | 192/3.29 |
| 5,265,017 | * 11/1993 | Kaya et al. .......................... | 701/67 |
| 5,267,158 | * 11/1993 | Sakaguchi et al. .................. | 701/68 |
| 5,274,553 | * 12/1993 | Boaroman ............................ | 701/55 |
| 5,434,780 | 7/1995 | Kume et al. ......................... | 701/65 |
| 5,475,590 | * 12/1995 | Palansky et al. .................... | 701/67 |
| 5,496,277 | 3/1996 | Minowa et al. ..................... | 477/62 |
| 5,637,052 | * 6/1997 | Hirota et al. ........................ | 477/61 |
| 5,743,829 | * 4/1998 | Tanizawa et al. ................... | 477/174 |
| 5,754,969 | * 5/1998 | Ando et al. ......................... | 701/67 |

FOREIGN PATENT DOCUMENTS

| | | |
|---|---|---|
| 0 533 419 A1 | 9/1992 | (EP) . |
| 0 559 342 A2 | 2/1993 | (EP) . |
| 9-32915 | 2/1997 | (JP) . |

* cited by examiner

*Primary Examiner*—Jacques H. Louis-Jacques
*Assistant Examiner*—Brian J. Broadhead
(74) *Attorney, Agent, or Firm*—Armstrong, Westerman, Hattori, McLeland & Naughton, LLP

(57) ABSTRACT

A lock-up control device is provided to control the engaging and release of a lock-up clutch, which is arranged in parallel with a torque converter to transmit driving force of an engine of a car. Herein, target driving force is calculated based on accelerator pedal opening and car velocity. A present shift position is detected using a shift map based on accelerator pedal opening, car velocity and engine speed. Target engine torque is calculated based on the target driving force and present shift position as well as a torque amplification ratio, which is detected when the torque converter is placed in a torque amplification state. A lock-up release instruction is issued under conditions that the torque converter is placed in the torque amplification state while the target engine torque is greater than a preset value, which is determined in advance based on a torque characteristic of the engine. In addition, under the condition that the engaging of the lock-up clutch is released, the device makes a decision as to whether a shift-down operation is performed or not. Herein, accumulation is performed on the accelerator pedal opening under the condition that the target engine torque is greater than the preset value. So, a shift-down instruction is issued under the condition that an accumulated value of the accelerator pedal opening exceeds a threshold value in accumulation of the accelerator pedal opening.

3 Claims, 7 Drawing Sheets

FIG.6

| | | | |
|---|---|---|---|
| F_MTDN1 | 0 | 1 | 0 |
| F_MTDN2 | 1 | 1 | 0 |
| CONDITION | FROM TIMING OF TE>TEMAX TO DOWNSHIFT START TIMING | FROM DOWNSHIFT START TIMING TO TIMING WHEN ΔAP REACHES DAPBKD2 | NORMAL STATE THAT SHIFT-DOWN CONTROL IS NOT PERFORMED |
| | | SHIFT HOLD | |

LOCK-UP CONTROL DEVICE

BACKGROUND OF THE INVENTION

1. Field of the Invention

This invention relates to lock-up control devices that control lock-up clutches provided in power transmission systems of cars equipped with automatic gears. This application is based on Patent Application No. Hei 9-269060 filed in Japan, the content of which is incorporated herein by reference.

2. Description of the Related Art

The power transmission system of the car uses both of a torque converter and a lock-up clutch so as to improve power transmission efficiency. The conventional lock-up control device, provided for the power transmission system of the car, is designed to use torque amplification effect of the torque converter (or deceleration effect) by adjusting engagement force of the lock-up clutch in response to situation in revolutions of the engine. In addition, the paper of Japanese Patent Application, Publication No. Hei 9-32915 discloses an example of the lock-up control device, which is designed as follows:

Based on depression of an accelerator pedal, a decision is made as to whether a driver has an intention to accelerate the car or not. If the driver has such an intention to accelerate the car, the lock-up control device releases an engaged state of the lock-up clutch, so that the power transmission system is placed in a power transmission state using the torque converter. Thus, the lock-up control device is capable of using torque amplification effect of the torque converter for acceleration of the car.

The above lock-up control device uses the torque amplification effect of the torque converter according to needs to improve acceleration performance of the car. In addition, the lock-up control device is capable of further improving the acceleration performance by adjusting deceleration ratio (or torque amplification ratio) of the torque converter based on variation ratio of engine load such that the engine can demonstrate the maximum driving force.

In general, it is preferable to obtain good fuel efficiency by employing an efficient way for transmission of the driving force of the engine. In order to do so, it is necessary to maintain the lock-up clutch as tightly as possible, in other words, it is necessary to place the lock-up clutch in an engaged state, so that utilization of the torque amplification effect of the torque converter is made minimal, wherein the torque amplification effect is utilized by releasing the engaging of the lock-up clutch.

In some case, a driver demands the car to make a high degree of acceleration corresponding to a high level of torque, which exceeds an amount of torque that is obtained by using the aforementioned torque amplification effect of the torque converter. In order to obtain such a high level of torque that is demanded by the driver, it is necessary to perform shift-down operation. Herein, acceleration performance of the car is greatly influenced by a manner to perform the shift-down operation. In general, the shift-down operation is performed in response to two stages of decisions, which are adequately made in different procedures. According to a first procedure, the device makes a decision such that the shift-down operation is performed in accordance with a shift map, which shows optimum shift positions on the basis of the relationship between the throttle opening and car velocity. According to a second procedure, a difference is detected between target torque and maximum torque corresponding to the above shift position, so if the engine does not have a room to increase engine torque thereof, the device makes a decision to perform the shift-down operation. Incidentally, the aforementioned two stages of decisions will be referred to as a first decision using the shift map and a second decision based on excessive engine torque, for example. By the way, gear-change boundary lines are drawn on the shift map to indicate events that gear-shift operations are performed. In other words, the shift-down operation is not performed unless the present point on the map representing the present relationship between the throttle opening and car velocity crosses a certain gear-change boundary line. For this reason, if the aforementioned first decision using the shift map is given a great weight, the shift-down operation does not follow up with accelerator pedal operation. As a result, drivability will be deteriorated. In contrast, if the second decision based on the excessive engine torque is given a great weight, the shift-down operation should be performed even in the case of the instantaneous shortage of the engine torque. In addition, the excessive engine torque occurs due to the shift-down operation, so shift-up operation is performed. Thus, the shift-up and shift-down operations are repeated, which is called a shift busy phenomenon.

SUMMARY OF THE INVENTION

It is an object of the invention to provide a lock-up control device which is capable of demonstrating good acceleration performance by using torque amplification effect of the torque converter as maximally as possible and which is capable of providing good fuel efficiency by activating release of the engaging of the lock-up clutch as minimally as possible.

It is another object of the invention to provide a lock-up control device that if shortage of torque is not cleared by utilization of the torque amplification effect of the torque converter, is capable of certainly performing shift-down operation to demonstrate good drivability without causing shift busy phenomenon.

A lock-up control device is provided to control the engaging and release of a lock-up clutch, which is arranged in parallel with a torque converter to transmit driving force of an engine of a car. Herein, target driving force is calculated based on accelerator pedal opening and car velocity. A present shift position is detected using a shift map based on accelerator pedal opening, car velocity and engine speed. Target engine torque is calculated based on the target driving force and present shift position as well as a torque amplification ratio, which is detected when the torque converter is placed in a torque amplification state. A lock-up release instruction is issued under conditions that the torque converter is placed in the torque amplification state while the target engine torque is greater than a preset value, which is determined in advance based on a torque characteristic of the engine. Therefore, it is possible to provide the engine torque as maximally as possible while maintaining the present shift position. Thus, it is possible to obtain good fuel efficiency by limiting control in release of the engaging of the lock-up clutch as minimally as possible.

In addition, under the condition that the engaging of the lock-up clutch is released, the device makes a decision as to whether a shift-down operation is performed or not. Therefore, in the case where the car is short of the engine torque even when the amplification effect of the torque converter is used, the device instructs the car to automatically perform the shift-down operation. Thus, it is possible to demonstrate good drivability.

In the above decision, accumulation is performed on the accelerator pedal opening under the condition that the target engine torque is greater than the preset value. So, a shift-down instruction is issued under the condition that an accumulated value of the accelerator pedal opening exceeds a threshold value in accumulation of the accelerator pedal opening. Using the accumulation of the accelerator pedal opening, it is possible to certainly acknowledge an event that the driver continues his or her intention to accelerate the car. Only when the driver truly has the acceleration intention, the device instructs the car to perform the shift-down operation. Thus, it is possible to certainly avoid occurrence of the shift busy phenomenon.

BRIEF DESCRIPTION OF THE DRAWINGS

These and other objects, aspects and embodiment of the present invention will be described in more detail with reference to the following drawing figures, of which:

FIG. 6 shows conditions of flags which are used for the shift-down control;

DESCRIPTION OF THE PREFERRED EMBODIMENT

This invention will be described in further detail by way of example with reference to the accompanying drawings.

Figure 1:
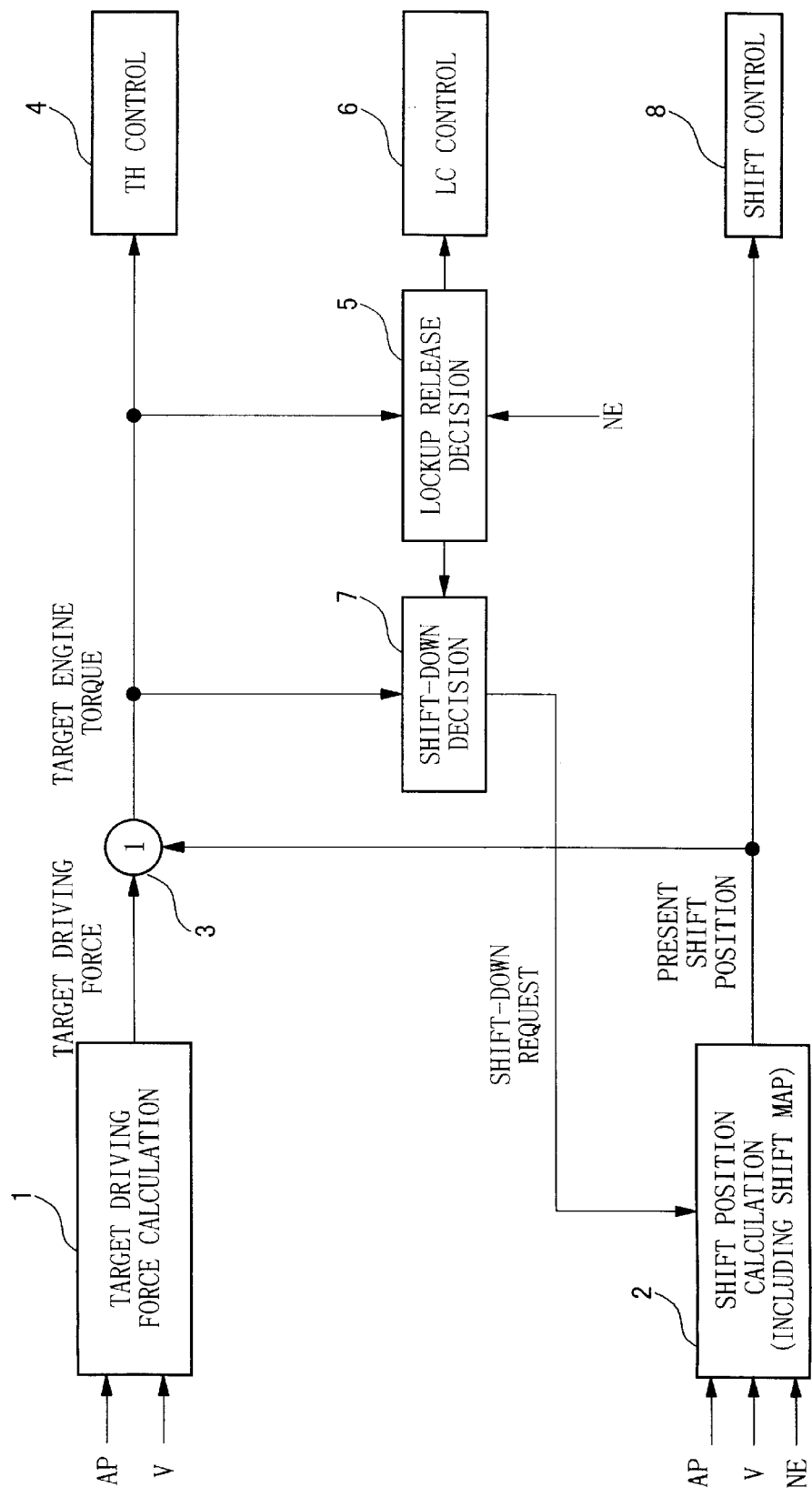
FIG. 1 is a block diagram showing a configuration of a lock-up control device in accordance with embodiment of the invention.

FIG. 1 shows a configuration of a lock-up control device in accordance with the preferred embodiment of the invention.

Figure 7:
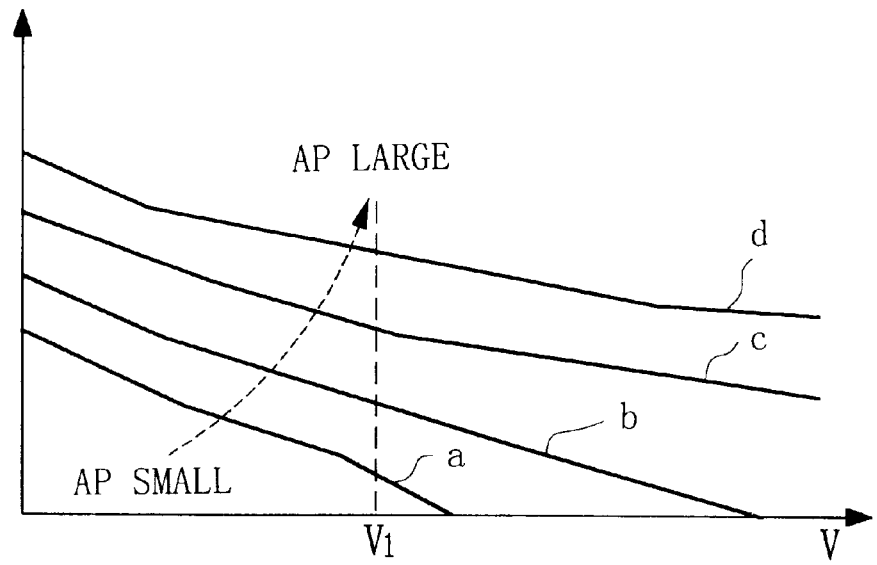
FIG. 7 is a graph showing relationships between target driving force and accelerator pedal opening.

In FIG. 1, a target driving force calculation unit 1 performs calculations based on detection values of accelerator pedal manipulation value AP and car velocity V so as to produce target driving force (in other words, torque that an engine should generate) based on driver's intention to accelerate the car. Namely, the target driving force calculation unit 1 stores a map representing relationships (see FIG. 7) which are established between target driving forces and car velocities with respect to accelerator pedal openings respectively. FIG. 7 shows four characteristic curves, which are denoted by reference symbols of "a", "b", "c" and "d" respectively. Herein, accelerator pedal openings are sequentially increased as in an order of the characteristic curves a, b, c and d. In the case of the characteristic curve "a" whose accelerator pedal opening is small at prescribed velocity V1, it can be said that a demand for acceleration to a higher car velocity is small. So, the target driving force calculation unit 1 determines the target driving force to be small. In the case of the characteristic curve "d" whose accelerator pedal opening is large at the prescribed velocity V1, it can be said that the driver demands to accelerate the car to a higher car velocity. So, the target driving force calculation unit 1 determines the target driving force to be large. A shift position calculation unit 2 stores a shift map representing relationships between the accelerator pedal openings AP and car velocities V as well as engine speeds NE. In addition, the shift position calculation unit 2 outputs a shift-down instruction based on a decision result of a shift-down decision unit 7, which will be described later.

The target driving force and a shift position signal, which is output from the shift position calculation unit 2, are supplied to an arithmetic unit 3. The arithmetic unit 3 calculates "demanded" target engine torque based on the target driving force and a deceleration ratio corresponding to the shift position. The target engine torque calculated by the arithmetic unit 3 is supplied to a throttle control unit 4. Thus, the throttle control unit 4 outputs a throttle adjustment instruction, by which a throttle is controlled to have a throttle opening which will actualize the target engine torque.

The target engine torque is supplied to a lock-up release decision unit 5 as well. The lock-up release decision unit 5 stores a table representing relationships between engine speed NE and utilizable engine torque TEX. Based on information of the engine speed NE and information of the utilizable engine torque TEX, the lock-up release decision unit 5 makes a decision as to whether the engine has a room to increase the engine torque up to the target engine torque or not. In addition, the lock-up release decision unit 5 stores data regarding torque ratios (or deceleration ratios) of the torque converter. So, the lock-up release decision unit 5 makes a decision as to whether the torque ratio of the torque converter, corresponding to engine speed which is established after the lock-up is released, is greater than "1" or not. In other words, it makes a decision as to whether the engine is placed in a decelerated state or not. Thus, the lock-up release decision unit 5 issues an instruction as to whether the lock-up is released or not on the basis of results of the aforementioned decisions. This instruction is supplied to a lock-up control unit 6. The lock-up control unit 6 supplies an actuator (e.g., hydraulic solenoid) operating the lock-up clutch with a control signal, by which a degree of engaging of the lock-up clutch is controlled in response to a car travel condition. Incidentally, the degree of engaging of the lock-up clutch is defined by a ratio between power transmission of the lock-up clutch and power transmission of the torque converter. Based on the aforementioned decisions, the lock-up release decision unit 5 also supplies the actuator with a control signal to release the engaged state of the lock-up clutch.

The target engine torque is supplied to a shift-down decision unit 7. Under the condition where the lock-up release decision unit 5 supplies the shift-down decision unit 7 with an instruction that the lock-up should be released, the shift-down decision unit 7 makes a decision as to whether shift-down operation is demanded or not on the basis of the accelerator pedal opening AP and the target engine torque.

If the shift-down decision unit 7 determines that the shift-down operation should be performed, it outputs a shift-down instruction to the shift position calculation unit 2. The shift position calculation unit 2 produces a shift position signal based on the "present" shift position. Normally, the shift position signal represents a same shift position of the present shift position. When receiving the shift-down instruction, the shift position calculation unit 2 produces a shift position signal representing a shift position, which is downed from the present shift position. The shift position signal is forwarded to a shift control unit 8. To actualize the shift position designated by the shift position signal, the shift control unit 8 outputs an instruction to drive a mechanism used for the shift-down operation.

Figure 2:
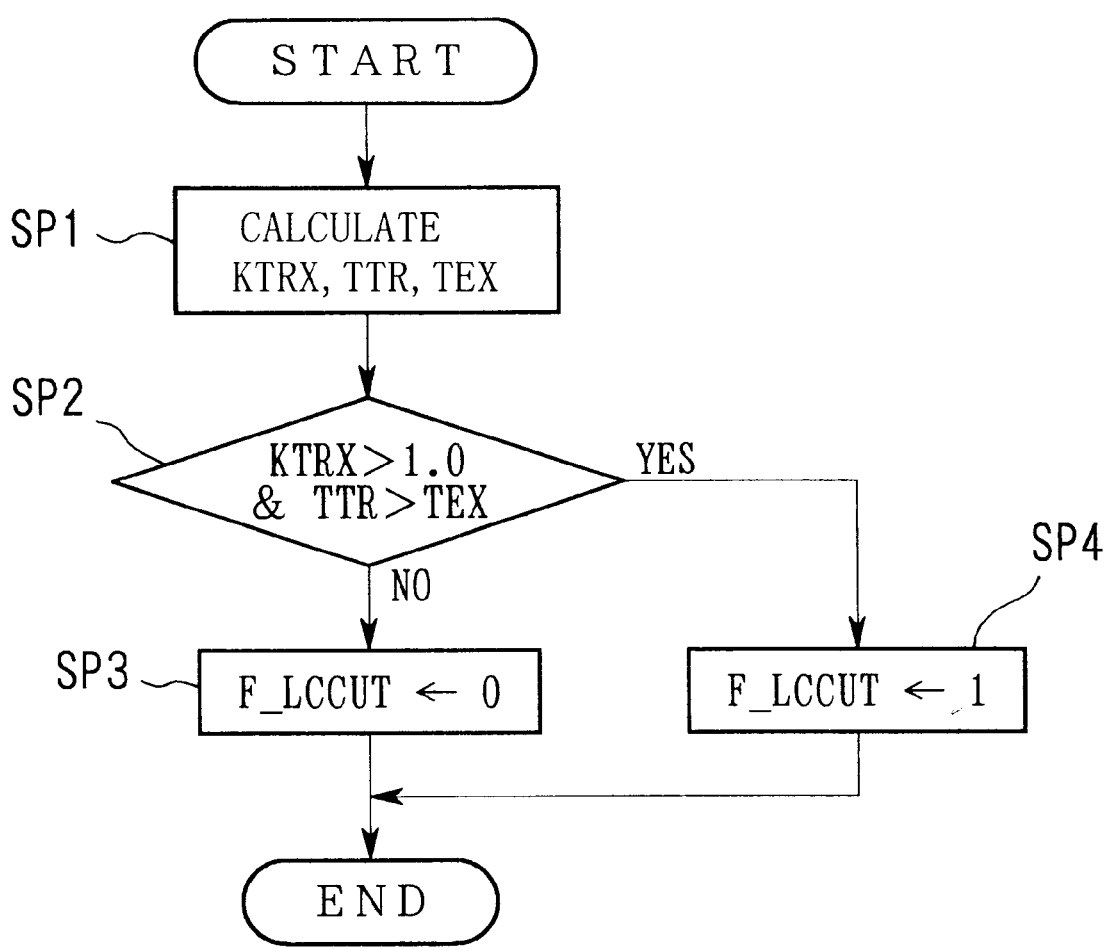
FIG. 2 is a flowchart showing a lock-up release process.

Next, a description will be given with respect to content of control of the lock-up release decision unit 5 with reference to a flowchart shown in FIG. 2. Herein, the description is made mainly with regard to a situation of the torque converter as to whether the torque converter is placed in a torque amplification state or not as well as a function of a torque converter decision unit for detecting a torque amplification ratio.

Figure 8:
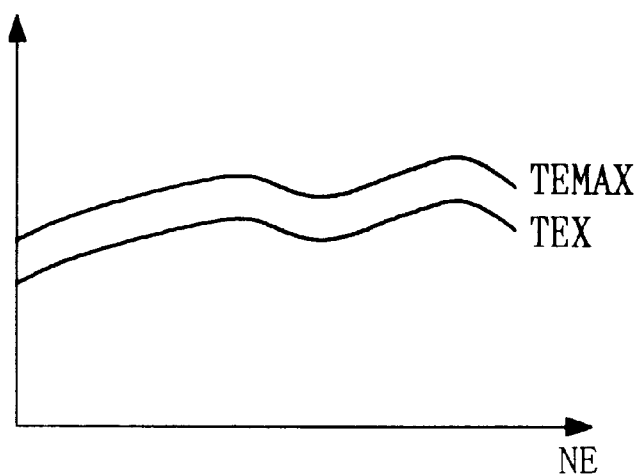
FIG. 8 is a graph showing a relationship between a preset value of engine torque that is determined in response to engine speed and utilizable engine torque.

In step SP1, the lock-up release decision unit 5 (hereinafter, simply referred to as the unit 5) produces demanded turbine torque TTR based on the target driving force and present shift position. The unit 5 produces a torque converter slip ratio ETRX at the lock-up release timing on the basis of the demanded turbine torque TTR and an input shaft speed of the torque converter. Then, it reads a torque ratio KTRX of the torque converter from a table, which is prepared in advance to represent relationships between the tor-con slip ratios and torque amplification ratios of the torque converter. In addition, it produces demanded engine torque based on accelerator pedal opening AP. Based on the torque ratio KTRX, it produces demanded turbine torque TTR which is demanded to actualize the above engine torque. Further, it reads a maximum value of utilizable engine torque (TEX) at the present engine speed from a torque characteristic table, which is stored in advance on a ROM to represent relationships between the engine speed NE and engine torque TE. As shown in FIG. 8, the above utilizable engine torque TEX is lower than a preset value TEMAX, which is suited to the present engine speed. Herein, the present value TEMAX corresponds to engine torque that can be output when the throttle is placed in a full open state at the present shift position. Normally, it is possible to obtain the best engine efficiency by using the utilizable engine torque TEX.

In step SP2, a decision is made as to whether both of inequalities of "KTRX>1" and "TTR>TEX" are established or not. In other words, the unit 5 makes a decision as to whether the torque converter is placed in a torque amplification range or not while making a decision as to whether the demanded engine torque is greater than the utilizable engine torque or not. Herein, the utilizable engine torque corresponds to torque that the engine imparts to a turbine shaft of the torque converter to provide "demanded" driving force. If a decision result is "NO", the unit 5 transfers control to step SP3. If "YES", it transfers control to step SP4.

In step SP3, the unit 5 clears a flag F_LCCUT which represents a message that the lock-up should not be released. Then, it ends control thereof In step SP4, the unit 5 set sets the flag F_LCUUT to "1". Then, it ends control thereof.

In the case of F_LCCUT=1, the lock-up control unit 6 controls the actuator operating the lock-up clutch to release the engaging of the lock-up clutch.

Figure 3:
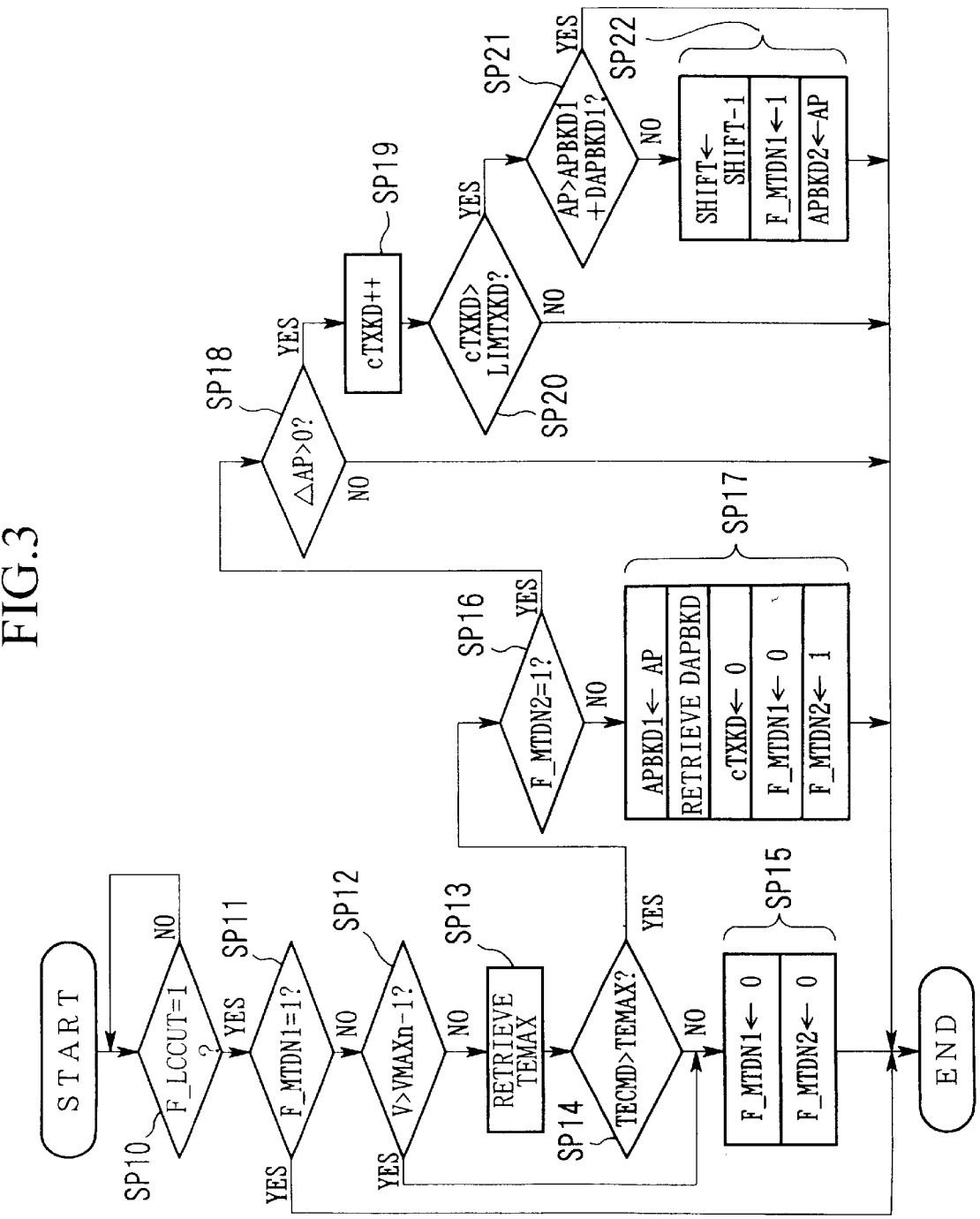
FIG. 3 is a flowchart showing a shift-down control process.

With reference to a flowchart shown in FIG. 3, a description will be given with respect to content of control of the shift-down decision unit 7 in connection with operation of a shift-down control unit.

In step SP10, the shift-down decision unit 7 (hereinafter, simply referred to as the unit 7) makes a decision as to whether "1" is set to the flag F_LCCUT or not. The unit 7 transfers control to step SP1L only when a decision result is "YES". If the decision result is "NO", the unit does not perform shift-down control.

In step SP11, the unit 7 makes a decision as to whether "1" is set to a flag F_MTDN1 or not. Then, it transfers control to step SP12 when a decision result is "NO". If the decision result is "YES", it ends shift-down control. Incidentally, the flag F_MTDN1 cooperates with a flag F_MTDN2 to show which stage the shift-down control proceeds to. Conditions to set or reset those flags will be described later.

In step SP12, the unit 7 makes a decision as to whether the measured car velocity (V) is greater than downshift limit car velocity $VMAX_{n-1}$ or not. Herein, the downshift limit car velocity $VMAX_{n-1}$ corresponds to a lower shift position "n–1", which is lower than a present shift position "n". Then, it transfers control to step SP13 when a decision result is "NO". If the decision result is "YES", it transfers control directly to step SP15. The aforementioned car velocity VMAX corresponds to data, which are determined based on mechanical performance of the change gear with regard to each of shift positions and are stored in advance in a prescribed storage area. Even if it is determined that the shift-down operation should be performed, execution of the shift-down operation is prohibited in the case where the car velocity V is greater than the downshift limit car velocity $VMAX_{n-1}$, by which the change gear is prevented from being damaged (or destructed).

In step SP13, the unit 7 retrieves a preset value TEMAX from the table, which is stored in advance on the ROM to represent relationships between the engine speed NE and engine torque TE. Herein, the retrieved preset value TEMAX represents engine torque corresponding to the present engine speed. In other words, this present value TEMAX corresponds to engine torque that can be output at the present shift position n when the throttle control unit controls the throttle to be placed in a full open state.

In step SP14, the unit 7 makes a decision as to whether demanded engine torque TECMD, which is determined based on the accelerator pedal opening, is greater than the aforementioned preset value TEMAX or not. Then, it transfers control to step SP16 when TECMD is greater than TEMAX. If a decision result is "NO", it can be said that the engine has a room to increase the engine torque thereof, so that the shift-down operation is not required. In this case, the unit 7 transfers control to step SP15, wherein both of flags F_MTDN1 and F_MTDN2 are cleared.

In step SP16, the unit 7 makes a decision as to whether "1" is set to the flag F_MTDN2 or not. If a decision result is "NO", the unit 7 transfers control to step SP17. If "YES", it transfers control directly to step SP18.

In step SP17, the unit 7 substitutes prescribed values for various kinds of parameters respectively, which will be described below.

The unit 7 substitutes a measured value "AP" of the accelerator pedal opening for an amount of accelerator pedal opening APBKD1 at the decision start timing.

Threshold values are set for an amount of variations of accelerator pedal opening "ΔAP" as decision criterion for the shift-down control, wherein they are stored in the table, which is stored on the ROM in advance. That is, a threshold value DAPBKD1 is set as decision criterion for execution of the shift-down control, while a threshold value DAPBKD2 is set as decision criterion for release of the shift-down control. So, the unit 7 retrieves those threshold values from the table. In general, as the car velocity becomes large, the accelerator pedal opening required for acceleration becomes large as well, so the threshold value DAPBKD1 correspondingly becomes large.

The unit 7 resets a count value cTXKD of a counter whose count value is increased every time the amount of variations of accelerator pedal opening ΔAP is varied in an increasing direction.

Then, the unit 7 clears the flag F_MTDN1 while "1" is set to the flag F_MTDN2.

In step SP18, a decision is made as to whether the amount of variations of accelerator pedal opening ΔAP is positive or not. Then, the unit 7 transfers control to step SP19 when a decision result is "YES". If the decision result is "NO", it is assumed that the driver has no intention to further depress the accelerator pedal for further acceleration. So, the unit 7 ends the shift-down control.

In step SP19, the unit 7 increases the aforementioned count value cTXKD of the counter by an increment.

In step SP20, a decision is made as to whether the count value cTXKD exceeds a threshold value LIMTXKD or not. Then, the unit 7 transfers control to step SP21 when a decision result is "YES". If the decision result is "NO", it is assumed that the driver has less (or small) intention to increase the accelerator pedal opening, in other words, the driver has less (or small) intention to accelerate the car. So, the unit 7 ends the shift-down control.

In step SP21, the unit 7 performs comparison between the accelerator pedal opening AP and sum of threshold values APBKD1 and DAPBKD1, which are set as threshold values of the accelerator pedal opening for the start and execution of the shift-down control. If the accelerator pedal opening AP is greater than the above sum of the threshold values, the unit 7 transfers control to step SP22. If the accelerator pedal opening A is smaller than the sum of the threshold values, it is discriminated that the shift-down operation is not required, so the unit 7 ends the shift-down control. Namely, the unit 7 proceeds to step SP22 to execute the shift-down operation (or downshift) under the condition that the accelerator pedal opening AP is increased to be more than the threshold values of the accelerator pedal opening.

In step SP22, the unit 7 sets each of parameters to execute the downshift, as follows:

A value "SHIFT-1" is set to a parameter SHIFT representing the shift position. That is, "1" is subtracted from the parameter SHIFT representing the shift position, so that a new shift position which is one gear lower than the foregoing shift position is set to the parameter SHIFT.

"1" is set to the flag F_MTDN1 showing an event that the downshift is executing.

Thus, the aforementioned step SP11 retains the decision result of "YES" unless the flag F_MTDN1 is cleared. So, the shift position is retained to conform with "SHIFT-1" while the shift-down control is not performed.

The accelerator pedal opening AP at execution of the downshift is set to APBKD2, which represents a release-decision-related amount of variations of accelerator pedal opening used for release decision.

Figure 4:
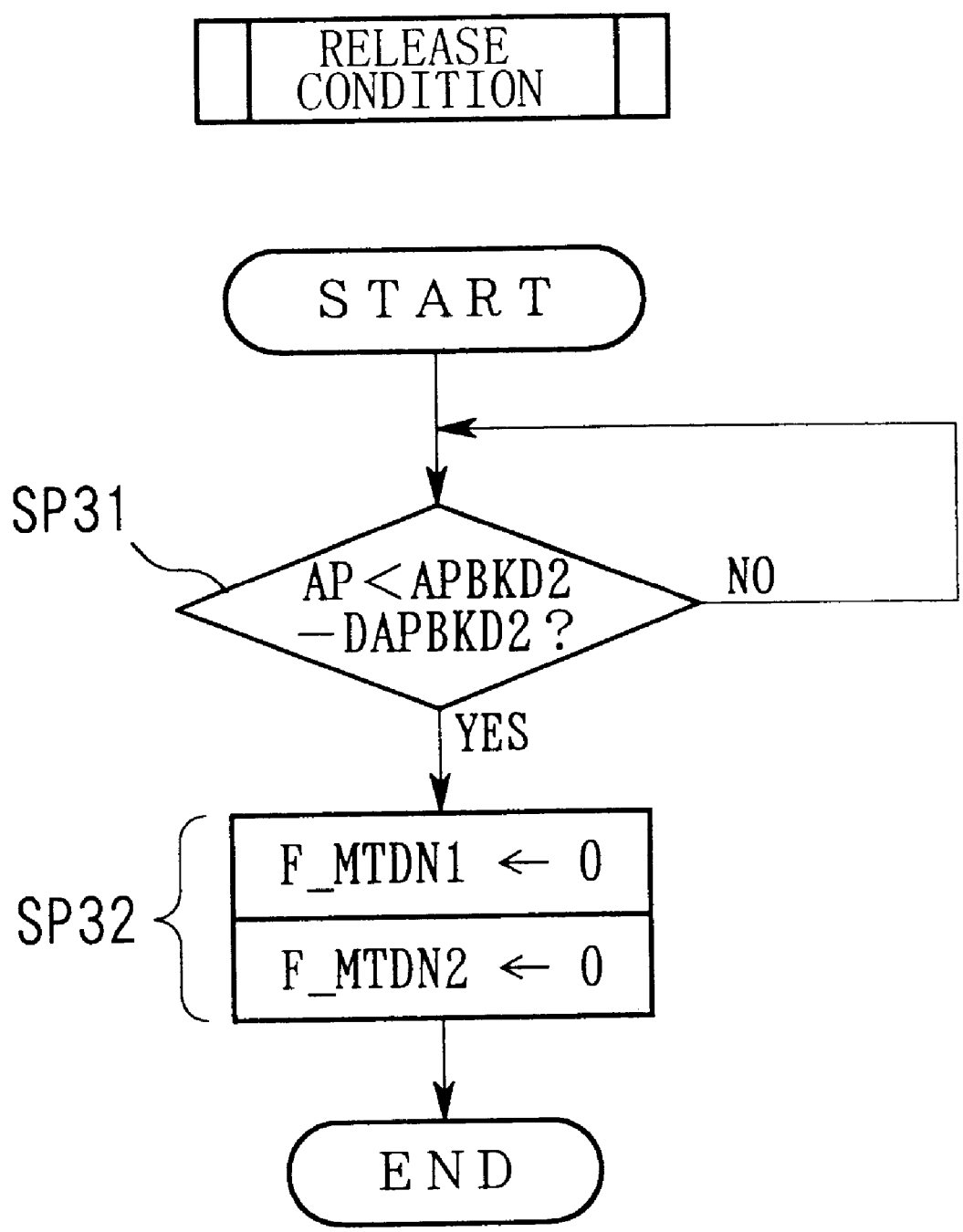
FIG. 4 is a flowchart showing a shift-down control release process.

Next, a description will be given with respect to a shift hold release operation with reference to a flowchart shown in FIG. 4.

In step SP31, comparison is made between the present accelerator pedal opening AP and a value which is produced by subtracting the release-decision-related threshold value DAPBKD2 from the release-decision-related amount of variations of accel pedal opening APBKD2. If it is detected that the present accelerator pedal opening AP becomes smaller than the above value, the device transfers control to step SP32. In step SP32, the device clears both of the flags F_MTDN1 and F_MTDN2. Thus, the device ends control at the state which enables the shift-down control based on the foregoing decision of the step SP11 shown in FIG. 3. That is, if the accelerator pedal opening AP is retained continuously small as compared with the prescribed value, it is assumed that the driver does not continue to hold the intention to accelerate the car any more. So, the device automatically ends the control to stop accumulation of the accelerator pedal opening. If the accelerator pedal opening AP does not become smaller than the prescribed value, the device repeats the step SP31 without changing the aforementioned flags F_MTDN1 and F_MTDN2.

Next, a description will be given with respect to the aforementioned control in a further detail way with reference to a time chart of FIG. 5, which shows variations of the accelerator pedal opening in a lapse of time.

Figure 5:
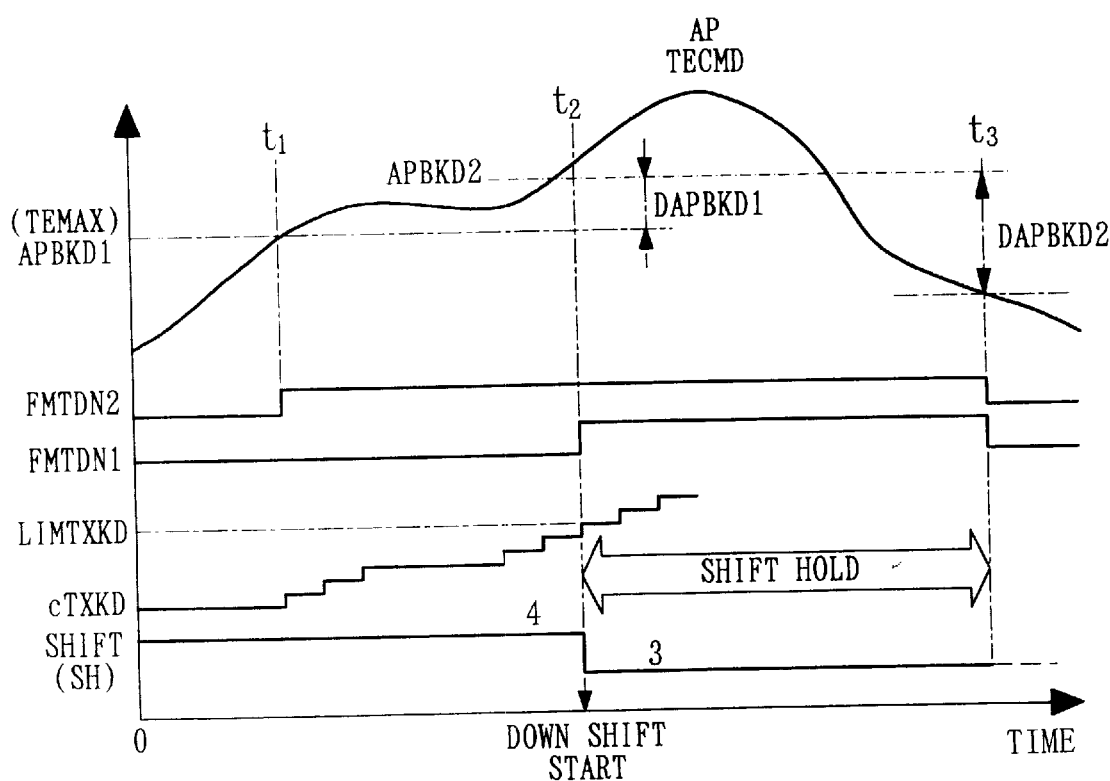
FIG. 5 is a time chart showing a concrete example of shift-down control which is performed by the lock-up control device of FIG. 1.

In FIG. 5, an amount of the accelerator pedal opening starts increasing at time t=0. At time t1 when the accelerator pedal opening exceeds the threshold value TEMAX (=APBKD1) of accelerator pedal opening at time t1, "1" is set to the flag F_MTDN2 in the foregoing step SP17 shown in FIG. 3. Due to the setting of F_MTDN2=1, the device transfers control from step SP16 to step SP19 via step SP18. In step SP19, the foregoing count value cTXKD is increased by an increment. In a duration that the accelerator pedal opening is held greater than the prescribed value, the count value cTXKD is increased continuously. At time t2, it is detected that the count value cTXKD exceeds the threshold value LIMTXKD in accumulation of the accelerator pedal opening. Such accumulation of the accelerator pedal opening can be actualized without using the special device and is performed using the software processing with ease. On the other hand, when the driver stops depression of the accelerator pedal, the count value cTXKD is not increased anymore. Thus, the device does not perform shift-down operation. In other words, the shift-down operation is performed only when the driver continues to hold his or her intention to accelerate the car.

The present embodiment employs the accumulation of the accelerator pedal opening. However, it is possible to use other methods instead of the aforementioned manner of accumulation. For example, the device counts a number of clock pulses after it is detected that the accelerator pedal opening exceeds a certain threshold value. Herein, a counted number represents elapsed time that elapses after the accelerator pedal is depressed by a predetermined value. Such a counted number can be used as an accumulated value of the accelerator pedal opening. In this case, the accumulation of the accelerator pedal opening can be performed by the software processing with ease.

If in step SP21, it is detected that the accelerator pedal opening AP exceeds the aforementioned threshold value TEMAX of accelerator pedal opening by the prescribed value DAPBKD1 or more, the device makes a decision that downshift should be performed. Thus, in step SP22, "1" is set to the flag F_MTDN1, so that the downshift is executed. Thereafter, the change gear is placed in a shift hold state. Namely, in the case where the engine has no room to increase the engine torque thereof so that the shift-down operation is demanded, the device activates the shift-down operation under the condition that the driver continues to hold his or her intention to accelerate the car. Thus, it is possible to demonstrate good drivability by the shift-down operation that is performed based on the driver's intention of acceleration. In addition, it is possible to avoid occurrence of excessive frequency to change gears. Further, the device makes a decision that the shift-down operation should be performed only when the driver has strong intention to accelerate the car. At time t3 when the accelerator pedal opening AP becomes lower than the release-decision-related amount of accelerator pedal opening APBKD2 by the release-decision-related threshold value DAPBKD2 or more, the device transfers control to step SP32 based on the foregoing decision of the step SP31 (see FIG. 4). Thus, in step SP32, the device clears both of the flags F_MTDN1 and F_MTDN2. As a result, the device is placed in a standby state to wait for a next time to perform shift-down control.

Conditions of the flags F_MTDN1 and F_MTDN2 are summarized by FIG. 6. In a state where shift-down control is not performed, both of those flags are cleared by the foregoing step SP22. In a duration between the first timing that the accelerator pedal opening exceeds TEMAX and the second timing that the shift-down operation is executed, "1" is set to the flag F_MTDN2 only. After the shift-down operation is executed, "1" is set to both of the flags F_MTDN1 and F_MTDN2 until an amount of decrease of the accelerator pedal opening reaches DAPBKD2.

As described heretofore, the present embodiment performs shiftdown control by using the detection value AP of the "actual" accelerator pedal opening. Instead, it is possible to use fuzzy estimation, wherein travel environment of the car is estimated by the fuzzy control. So, it is possible to use an amount of accelerator pedal opening which is corrected based on the estimated travel environment of the car. In the case of the slope travel, for example, the amount of accelerator pedal opening is multiplied by a coefficient to be greater than the actual accelerator pedal opening. In the case of the congestion travel, the amount of accelerator pedal opening is multiplied by a coefficient to be smaller than the actual accelerator pedal opening. Thus, the shift-down control is performed using such a multiplied value of the accelerator pedal opening.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A lock-up control device that controls engaging force in a lock-up clutch arranged in parallel with a torque converter to transmit driving force of an engine, said lock-up control device comprising:

lock-up control means for outputting a control signal to a driving device of a lock-up clutch to execute the engaging and release of the lock-up clutch;

target driving force calculation means for calculating target driving force of a car based on accelerator pedal opening and car velocity;

shift position detecting means for detecting a present shift position;

torque converter state determining means for making a decision as to whether the torque converter is placed in a torque amplification state or not if the lock-up clutch is released and for detecting a torque amplification ratio if the torque converter is placed in the torque amplification state;

calculation means for calculating target engine torque based on the target driving force, the present shift position and the torque amplification ratio;

comparison means for comparing the target engine torque with a preset value which is determined in advance from a torque characteristic of the engine, the preset value corresponding to an engine torque output in the present shift position when the throttle opening is placed in a substantially full open state; and lock-up release decision means for outputting a lock-up release instruction to the lock-up control means under a condition where the comparison means determines that the target engine torque is greater than the preset value and the torque converter state determining means determines that the torque converter is placed in the torque amplification state.

2. A lock-up control device according to claim 1 further comprising shift-down decision means for making a decision as to whether a shift-down operation is performed or not under a condition where the lock-up release decision means issues the lock-up release instruction so that the engaging of the lock-up clutch is released.

3. A lock-up clutch control device according to claim 2, wherein the shift-down decision means performs accumulation of the accelerator pedal opening so as to provide an accumulated value of the accelerator pedal opening under a condition where the target engine torque is greater than the preset value, so that the shift-down decision means issues a shift-down instruction under a condition where the accumulated value of the accelerator pedal opening exceeds a threshold value in accumulation of the accelerator pedal opening, which is determined in advance.

* * * * *